US012247160B2

(12) United States Patent
Chin et al.

(10) Patent No.: US 12,247,160 B2
(45) Date of Patent: Mar. 11, 2025

(54) METHOD FOR CONTROLLING PRODUCTION OF EXCESSIVE WATER AND AQUEOUS FLUIDS IN OIL AND GAS WELLS

(71) Applicant: ENERGY SOLUTIONS (US) LLC, Princeton, NJ (US)

(72) Inventors: Chee Fei Chin, Singapore (SG); Zhihua Zhang, Singapore (SG); Zhenxing Cheng, Shanghai (CN); Ahmed Rabie, Willingboro, NJ (US); Hoang Van Le, Spring, TX (US)

(73) Assignee: ENERGY SOLUTIONS (US) LLC, Princeton, NJ (US)

( * ) Notice: Subject to any disclaimer, the term of this patent is extended or adjusted under 35 U.S.C. 154(b) by 356 days.

(21) Appl. No.: 17/629,039

(22) PCT Filed: Jul. 23, 2019

(86) PCT No.: PCT/CN2019/097186
§ 371 (c)(1),
(2) Date: Jan. 21, 2022

(87) PCT Pub. No.: WO2021/012172
PCT Pub. Date: Jan. 28, 2021

(65) Prior Publication Data
US 2022/0275267 A1   Sep. 1, 2022

(51) Int. Cl.
*C09K 8/508* (2006.01)
*C08F 120/56* (2006.01)
*C09K 8/504* (2006.01)

(52) U.S. Cl.
CPC .......... *C09K 8/5083* (2013.01); *C08F 120/56* (2013.01); *C09K 8/5045* (2013.01)

(58) Field of Classification Search
None
See application file for complete search history.

(56) References Cited

U.S. PATENT DOCUMENTS

| 5,465,792 A | 11/1995 | Dawson et al. |
| 6,228,812 B1 | 5/2001 | Dawson et al. |
| 6,465,397 B1 | 10/2002 | Patterson |
| 9,580,535 B2 | 2/2017 | Wilson et al. |
| 2009/0260820 A1 | 10/2009 | Kurian et al. |
| 2012/0035085 A1* | 2/2012 | Parnell .................. C09K 8/588 507/213 |
| 2017/0029692 A1* | 2/2017 | Dugonjic-Bilic ...... C09K 8/887 |
| 2019/0153304 A1* | 5/2019 | Zelenev ................ C09K 8/604 |
| 2020/0369818 A1* | 11/2020 | Feng ..................... C08F 287/00 |

FOREIGN PATENT DOCUMENTS

| CN | 101595197 A | 12/2009 |
| CN | 101842551 A | 9/2010 |
| CN | 102477289 A | 5/2012 |
| CN | 103261380 A | 8/2013 |
| CN | 105733524 A | 7/2016 |
| CN | 107868170 A | 4/2018 |
| EP | 1 383 813 B1 | 4/2009 |
| WO | 9630421 A1 | 10/1996 |
| WO | 9801478 A1 | 1/1998 |
| WO | 9858974 A1 | 12/1998 |
| WO | 9935178 A1 | 7/1999 |

OTHER PUBLICATIONS

International Search Report issued in corresponding International Application No. PCT/CN2019/097186; mailed Apr. 22, 2020 (6 pages).
Written Opinon of the International Searching Authority issued in corresponding International Application No. PCT/JP2019/097186; dated Apr. 22, 2020 (4 pages).
Office Action issued in corresponding United Arab Emirates Patent Application No. P6000092/2022, dated Nov. 18, 2024 (7 pages).
Search Report issued in corresponding United Arab Emirates Patent Application No. P6000092/2022, dated Nov. 18, 2024 (2 pages).

* cited by examiner

Primary Examiner — John J Figueroa
(74) Attorney, Agent, or Firm — Osha Bergman Watanabe & Burton LLP

(57) ABSTRACT

Provided are methods for modifying the permeability of subterranean formations for the purposes of selectively reducing excessive production of water and aqueous fluids in oil and gas wells, wherein the methods utilize an emulsion containing a copolymer, which is typically prepared in an aqueous salt media.

13 Claims, No Drawings

METHOD FOR CONTROLLING PRODUCTION OF EXCESSIVE WATER AND AQUEOUS FLUIDS IN OIL AND GAS WELLS

The present application is a national stage of PCT Application No. PCT/CN2019/097186 filed on Jul. 23, 2019, which is herein incorporated by reference.

FIELD OF INVENTION

The present invention relates to compositions and methods for modifying the permeability of subterranean formations for the purposes of selectively reducing excessive production of water and aqueous fluids in oil and gas wells. The invention utilizes an emulsion which comprises (a) a copolymer in an amount of from 10 wt % to 30 wt %; (b) a water soluble salt in an amount of from 10 wt % to 50 wt %; (c) optionally a polyol; and (d) water as balance; weight percentages are based on the total weight of the emulsion. Said emulsion is typically prepared in an aqueous salt media.

BACKGROUND ART

Production of water and aqueous fluids from oil and gas wells is a common phenomenon. Water and aqueous fluids often co-exist with oil or gas in the same or adjacent formations. During recovery of oil or gas, water and aqueous fluids are often co-produced with the desired oil or gas, leading to operational problems. As oil and gas are removed from a producing well, water and aqueous fluids begin to push through the formation into the well where they are eventually produced along with the oil and gas. This reduces the amount of oil and gas that can be recovered. Further, once the water and aqueous fluids are removed from the well, they must be separated from the produced oil and gas and disposed of in an environmentally safe manner. This adds additional expense to the recovery operation. The production of water and aqueous fluids may also cause other problems, such as scaling of tubulars and surface equipment.

Methods have been developed to restrict water and aqueous fluids production. For example, synthetic water soluble or dispersible copolymers have been used for so-called relative permeability modification methods (hereinafter referred to as "RPM"). The RPM methods involve the reduction in the flow of subterranean water in the formation with oil and/or gas near the producing well, in which the permeability of water and aqueous fluids in the formation is minimized without causing a significant decline in oil and/or gas permeability. Thus, the RPM methods require modification of permeability with high selectivity across oil/gas and water. It is also highly desirable that the agents being used for RPM purposes are not affected by the acidic or alkaline conditions, salt content or high temperatures which are usually found within oil and gas wells.

In the conventional method of altering the permeability of water in underground formations, the crosslinkable polymers are injected into a formation simultaneously with a selected crosslinking system, each typically in the form of aqueous solutions. The solutions permeate into the regions having the highest water permeability, crosslinking reactions proceed over the course of hours, resulting in an aqueous, (swelled) gel.

Thermosetting phenol-aldehyde polymers are exemplary crosslinking systems used in combination with water-soluble crosslinkable polymer. Other crosslinking agents include multivalent metal compounds reactive with carboxyl-containing copolymers, for example, complexed chromium, zirconium, or titanium compounds.

U.S. Pat. No. 6,228,812 B1 discloses a composition comprising an aqueous polymer that can be used for selective permeability modification of subterranean formations to reduce or eliminate the amount of water produced from hydrocarbon wells without significantly affecting the production of hydrocarbons. The polymer is a copolymer of at least one anchoring group in combination with at least one hydrophilic monomer, such as AMPS. Typical anchoring groups are N-vinylformamide, N-methylacetamide, and/or N,N-diallylacetamide.

U.S. Pat. No. 6,465,397 B1 discloses an aqueous crosslinked AM/AMPS copolymers capable of providing infectivity in porous underground formations, and providing relative permeability modifying properties.

U.S. Pat. No. 5,465,792 B1 discloses an inverse emulsion crosslinked polymer to selectively reduce the production of water in a hydrocarbon bearing oil well. The polymer is composed of one or more nonionic monomers, and one or more cationic or anionic monomers. Typical nonionic monomers used are acrylamide, vinyl pyrrolidone and n-vinylacetamide. The anionic monomers used include acrylic acid, acrylamidomethylpropanesulfonic acid (AMPS), maleic acid, itaconic acid, styrene sulfonic acid and vinylphosphonic acid. The cationic monomers used include dimethyldiallylammonium chloride and acrylamidoethyltrimethylammonium chloride. Organic crosslinkers such as divinyl benzene, methylene bisacrylamide, diallylamine are added during or after the polymerisation process to achieve a 3-dimensional network structure for better water control.

Selectivity in water control conferred by those known RPM polymers are not satisfactory. Also, the known RPM compositions are usually in form of aqueous solutions which contain low level of polymer actives, and therefore, large volume of fluids containing the polymer actives needs to be injected into the oil and gas wells in order to provide sufficient water control effects. This causes increased operational costs and difficulties for the recovery operation.

There is a need to provide a composition which can provide robust efficiency and high selectivity in controlling excessive production of water and aqueous fluids in oil and gas wells. There is a need to provide a composition which has high level of RPM polymer active while the composition has acceptable viscosities. There is a need to provide a method for controlling excessive production of water and aqueous fluids in oil and gas wells which is cost efficient and convenient for oil and gas recovery operation.

SUMMARY OF INVENTION

In one aspect, there is provided a method for controlling aqueous fluids by treating a subterranean formation in a producing well, comprising the steps of:
  (1) providing an emulsion comprising: (a) a copolymer in an amount of from 10 wt % to 30 wt %; (b) a water soluble salt in an amount of from 10 wt % to 50 wt %; and (c) optionally a polyol; weight percentages are based on the total weight of the emulsion;
  (2) diluting said emulsion in water to form a treatment fluid;
  (3) introducing said treatment fluid into the producing well.

Advantageously, said emulsion comprises: (a) 15 wt % to 30 wt % of the copolymer; (b) 15 wt % to 50 wt % of the water soluble salt; (c) 0 to 5 wt % of the polyol; and (d) water; weight percentages are based on total weight of the emulsion.

Advantageously, said emulsion comprises: (a) 15 wt % to 25 wt % of the copolymer; (b) 20 wt % to 50 wt % of the water soluble salt; (c) 0 to 5 wt % of the polyol; and (d) water; weight percentages are based on total weight of the emulsion.

Said emulsion is typically prepared by a process comprising the steps of:
(i) an ionic charged polymeric dispersant is prepared from at least an ionic monomer, optionally in the presence of a radical polymerization control agent;
(ii) said polymer dispersant is charged into an aqueous solution comprising a nonionic monomer and an ionic monomer, the mixture is then subject to continuous polymerization, in presence of a water soluble salt, to obtain said copolymer.

Advantageously, said ionic charged polymeric dispersant is prepared from the ionic monomer in the presence of a radical polymerization control agent.

Said ionic charged polymeric dispersant is, for example, prepared from at least an ionic monomer according to general formula (II):

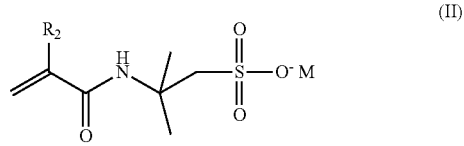

(II)

wherein:
$R_2$ is a hydrogen or a $C_1$ to $C_5$ alkyl or hydroxyalkyl;
M is hydrogen, an alkali metal ion, or $NR_4^+$ wherein R is a $C_1$ to $C_5$ alkyl or hydroxyalkyl.

Said nonionic monomer in the second step (ii) is, for example, according to the general formula (III):

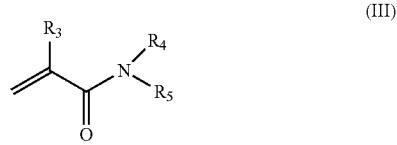

(III)

wherein:
$R_3$ is a hydrogen or a $C_1$ to $C_5$ alkyl or hydroxyalkyl;
$R_4$ and $R_5$, independently, is a hydrogen or a $C_1$ to $C_5$ alkyl or hydroxyalkyl; and
said ionic monomer in the second step (ii) is according to the general formula (II):

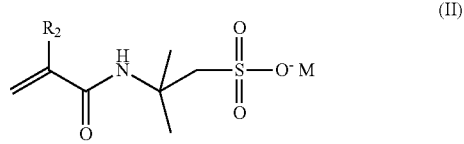

(II)

wherein:
$R_2$ is a hydrogen or a $C_1$ to $C_5$ alkyl or hydroxyalkyl;
M is hydrogen, an alkali metal ion or $NR_4^+$ wherein R is a $C_1$ to $C_5$ alkyl or hydroxyalkyl.

Said radical polymerization control agent is, for example, according to general formula (I):

(I)

wherein Z represents:
a hydrogen atom,
a chlorine atom,
an optionally substituted alkyl or optionally substituted aryl radical,
an optionally substituted heterocycle,
an optionally substituted alkylthio radical,
an optionally substituted arylthio radical,
an optionally substituted alkoxy radical,
an optionally substituted aryloxy radical,
an optionally substituted amino radical,
an optionally substituted hydrazine radical,
an optionally substituted alkoxycarbonyl radical,
an optionally substituted aryloxycarbonyl radical,
an optionally substituted carboxyl or acyloxyl radical,
an optionally substituted aryloxy radical,
an optionally substituted carbamoyl radical,
a cyano radical,
a dialkyl- or diaryl-phosphonato radical,
a dialkyl-phosphinato or diaryl-phosphinato radical, or
a polymer chain,
and $R_1$ represents:
an optionally substituted alkyl, acyl, aryl, aralkyl, alkene or alkyne group,
a saturated or unsaturated, aromatic, optionally substituted carbocycle or heterocycle, or
a polymer chain.

In another aspect, there is provided use of an emulsion for controlling aqueous fluids by treating a subterranean formation in a producing well, said emulsion comprising: (a) a copolymer in an amount of from 10 wt % to 30 wt %; (b) a water soluble salt in an amount of from 10 wt % to 50 wt %; and (c) optionally a polyol; weight percentages are based on the total weight of the emulsion.

DETAILED DESCRIPTION

Throughout the description, including the claims, the term "comprising one" or "comprising a" should be understood as being synonymous with the term "comprising at least one", unless otherwise specified, and "between" should be understood as being inclusive of the limits.

It should be noted that in specifying any range of concentration, weight ratio or amount, any particular upper concentration, weight ratio or amount can be associated with any particular lower concentration, weight ratio or amount.

As used herein, the term "alkyl" means a saturated hydrocarbon radical, which may be straight, branched or cyclic, such as, methyl, ethyl, n-propyl, iso-propyl, n-butyl, sec-butyl, t-butyl, pentyl, n-hexyl, cyclohexyl.

As used herein, the term "hydroxyalkyl" means an alkyl radical, which is substituted with a hydroxyl groups, such as hydroxymethyl, hydroxyethyl, hydroxypropyl, and hydroxydecyl.

As used herein, the terminology "$(C_n\text{-}C_m)$" in reference to an organic group, wherein n and m are each integers, indicates that the group may contain from n carbon atoms to m carbon atoms per group.

As used herein, the term "ionic monomer" means a monomer possessing an anionic or cationic charge, or a monomer possessing an amphoteric charge. Typical anionic monomers include 2-acrylamido-2-methylpropanesulfonic acid or a salt thereof, (meth)acrylic acid sodium salt and vinyl phosphate. Typical cationic monomers include 2-acryloxyethyl trimethyl ammonium chloride, methacryloxyethyl trimethyl ammonium chloride, and diallyldimethylammonium chloride. Typical amphoteric monomers include betaine group-containing (meth) acrylic ester and betaine group-containing (meth) acrylamide.

As used herein, the term "nonionic monomer" means a monomer without charge, typically such as acrylamide and N,N-dimethylacrylamide.

As used herein, the term "producing well" means a well which is naturally formed or is drilled into a subterranean formation for producing natural hydrocarbons, such as oil, gas and a mixture thereof. Producing well includes and is not limited to regular wells and irregular wells for oil and gas production.

As used herein, the term "polymeric dispersant" means a hydrophilic polymer soluble and dissolvable in water, which may typically function as a dispersant for following polymerization reactions.

The term "polymer dispersion" means a dispersion in which discrete polymer particles containing one or more nonionic and/or ionic monomers are dispersed in aqueous phase.

As used herein, the term "radical polymerization control agent" means a compound that is capable of extending the lifetime of the growing polymer chains in a polymerization reaction and of giving the polymerization a living or controlled nature. This control agent is typically a reversible transfer agent as used in controlled radical polymerizations known under the terminology RAFT or MADIX, which typically use a process of reversible addition-fragmentation transfer, such as those described, for example, in U.S. Pat. No. 9,580,535, PCT international publication nos. WO96/30421, WO 98/01478, WO 99135178, and WO 98/58974.

The present invention relates to a method for controlling aqueous fluids, such as water, by treating a subterranean formation in a producing well, comprising the steps of:
(1) providing an emulsion comprising: (a) a copolymer in an amount of from 10 wt % to 30 wt %; (b) a water soluble salt in an amount of from 10 wt % to 50 wt %; and (c) optionally a polyol; weight percentages are based on the total weight of the emulsion;
(2) diluting said emulsion in water to form a treatment fluid;
(3) introducing said treatment fluid into the producing well.

Said emulsion is typically prepared by a process comprising the steps of:
(i) an ionic charged polymeric dispersant is prepared from at least an ionic monomer, optionally in the presence of a radical polymerization control agent;
(ii) said polymer dispersant is charged into an aqueous solution comprising a nonionic monomer and an ionic monomer, the mixture is then subject to continuous polymerization, in presence of a water soluble salt, to obtain said copolymer.

Said method for controlling aqueous fluids notably concerns selectively reducing production of aqueous fluids, notably water, from the subterranean formation in the producing well.

Accordingly, the present invention also provides a method for selectively reducing production of aqueous fluids from a subterranean formation in a producing well, comprising the steps of:
(1) providing an emulsion comprising: (a) a copolymer in an amount of from 10 wt % to 30 wt %; (b) a water soluble salt in an amount of from 10 wt % to 50 wt %; and (c) optionally a polyol; weight percentages are based on the total weight of the emulsion;
(2) diluting said emulsion in water to form a treatment fluid;
(3) introducing said treatment fluid into the producing well.

The present invention also relates to use of an emulsion for controlling aqueous fluids by treating a subterranean formation in a producing well, said emulsion comprising: (a) a copolymer in an amount of from 10 wt % to 30 wt %; (b) a water soluble salt in an amount of from 10 wt % to 50 wt %; and (c) optionally a polyol; weight percentages are based on the total weight of the emulsion. The present invention also relates to use of an emulsion for selectively reducing production of aqueous fluids from a subterranean formation in a producing well, said emulsion comprising: (a) a copolymer in an amount of from 10 wt % to 30 wt %; (b) a water soluble salt in an amount of from 10 wt % to 50 wt %; and (c) optionally a polyol; weight percentages are based on the total weight of the emulsion.

In the above mentioned uses according to the invention, said emulsion is typically prepared by a process comprising the steps of:
(i) an ionic charged polymeric dispersant is prepared from at least an ionic monomer, optionally in the presence of a radical polymerization control agent;
(ii) said polymer dispersant is charged into an aqueous solution comprising a nonionic monomer and an ionic monomer, the mixture is then subject to continuous polymerization, in presence of a water soluble salt, to obtain said copolymer.

Emulsion

The emulsion according to the invention comprises:
(a) a copolymer in an amount of from 10 wt % to 30 wt %;
(b) a water soluble salt in an amount of from 10 wt % to 50 wt %; and
(c) optionally a polyol;
weight percentages are based on the total weight of the emulsion.

The emulsion contains water as balance.

The emulsion is typically prepared by a process which involves a polymerization in an aqueous salt media, wherein the copolymer is generated via two steps of reactions.

Specifically, said process for preparing the emulsion comprises the steps of:
(i) an ionic charged polymeric dispersant is prepared from at least an ionic monomer, optionally in the presence of a radical polymerization control agent;
(ii) said polymer dispersant is charged into an aqueous solution comprising a nonionic monomer and an ionic monomer, the mixture is then subject to continuous polymerization, in presence of a water soluble salt, to obtain said copolymer.

The first step (i) may be conduct in presence or absence of said salt media. The second step (ii) is conducted in presence of said salt media.

With regard to the first step (i), in one embodiment, an ionic charged polymeric dispersant is prepared from at least an ionic monomer, wherein the reaction takes place under free radical forming conditions. The resulting ionic charged polymeric dispersant will function as a stabilizer for the subsequent polymerization reaction. A water soluble salt may optionally be added in this step.

In another embodiment, an ionic charged polymeric dispersant is prepared from at least an ionic monomer in presence of a radical polymerization control agent. The reaction is thus conducted under controlled racial polymerization condition. The resulting ionic charged polymeric dispersant is a living polymer which may be copolymerized with additional monomers when added in subsequent step(s). A water soluble salt may optionally be added in this step. Accordingly, the present invention also relates to a method for controlling aqueous fluid by treating a subterranean formation in a producing well, comprising the steps of:

(1) providing an emulsion comprising: (a) a copolymer in an amount of from 10 wt % to 30 wt %; (b) a water soluble salt in an amount of from 10 wt % to 50 wt %; and (c) optionally a polyol; weight percentages are based on the total weight of the emulsion;

(2) diluting said emulsion in water to form a treatment fluid;

(3) introducing said treatment fluid into the producing well;

wherein said copolymer is prepared by a process comprising the steps of:

(i) an ionic charged polymeric dispersant is prepared from at least an ionic monomer in presence of a radical polymerization control agent;

(ii) said polymer dispersant is charged into an aqueous solution comprising a nonionic monomer and an ionic monomer, the mixture is then subject to continuous polymerization, in presence of a water soluble salt, to obtain said copolymer.

The radical polymerization control agent is advantageously a compound bearing a thiocarbonylthio group —S(C═S)—. According to some embodiments, the radical polymerization control agent may bear several thiocarbonylthio groups. It may optionally be a polymer chain bearing such a group. Thus, this radical polymerization control agent may, for example, correspond to general formula (I) below:

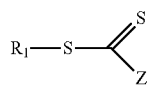

(I)

in which: Z represents:
 a hydrogen atom,
 a chlorine atom,
 an optionally substituted alkyl or optionally substituted aryl radical,
 an optionally substituted heterocycle,
 an optionally substituted alkylthio radical,
 an optionally substituted arylthio radical,
 an optionally substituted alkoxy radical,
 an optionally substituted aryloxy radical,
 an optionally substituted amino radical,
 an optionally substituted hydrazine radical,
 an optionally substituted alkoxycarbonyl radical,
 an optionally substituted aryloxycarbonyl radical,
 an optionally substituted carboxyl or acyloxyl radical,
 an optionally substituted aryloxy radical,
 an optionally substituted carbamoyl radical,
 a cyano radical,
 a dialkyl- or diaryl-phosphonato radical,
 a dialkyl-phosphinato or diaryl-phosphinato radical, or
 a polymer chain,
 and $R_1$ represents:
 an optionally substituted alkyl, acyl, aryl, aralkyl, alkene or alkyne group,
 a saturated or unsaturated, aromatic, optionally substituted carbocycle or heterocycle, or
 a polymer chain, which is preferably hydrophilic or water-dispersible when the agent is used in the first step.

The groups $R_1$ or Z, when they are substituted, may be substituted with optionally substituted phenyl groups, optionally substituted aromatic groups, saturated or unsaturated carbocycles, saturated or unsaturated heterocycles, or groups chosen from the following: alkoxycarbonyl or aryloxycarbonyl (—COOR'), carboxyl (—COOH), acyloxy (—O$_2$OR'), carbamoyl (—CONR'), cyano (—CN), alkylcarbonyl, alkylarylcarbonyl, arylcarbonyl, arylalkylcarbonyl, phthalimido, maleimido, succinimido, amidino, guanidino, hydroxyl (—OH), amino (—NR'), halogen, allyl, epoxy, alkoxy (—OR'), S-alkyl, S-aryl, groups of hydrophilic or ionic nature such as alkali metal salts of carboxylic acids, alkali metal salts of sulfonic acid, polyalkylene oxide chains (PEO, PPO), cationic substituents (quaternary ammonium salts), R' representing an alkyl or aryl group, or a polymer chain.

For the radical polymerization control agent of general formula (I), it is generally preferred for the group $R_1$ to be of hydrophilic nature. Advantageously, it is a water-soluble or water-dispersible polymer chain.

The group $R_1$ may alternatively be amphiphilic, i.e. it may have both hydrophilic and lipophilic nature. It is preferable for $R_1$ not to be hydrophobic.

As regards the radical polymerization control agent of general formula (I), $R_1$ may typically be a substituted or unsubstituted, preferably substituted, alkyl group. It may nevertheless comprise other types of group $R_1$, especially a ring or a polymer chain.

The optionally substituted alkyl, acyl, aryl, aralkyl or alkyne groups generally contain 1 to 20 carbon atoms, preferably 1 to 12 and more preferentially 1 to 9 carbon atoms. They may be linear or branched. They may also be substituted with oxygen atoms, especially in the form of esters or sulfur or nitrogen atoms.

Among the alkyl radicals, mention may be made especially of methyl, ethyl, propyl, butyl, pentyl, isopropyl, tert-butyl, pentyl, hexyl, octyl, decyl or dodecyl radicals.

The alkyne groups are radicals generally containing from 2 to 10 carbon atoms, and contain at least one acetylenic unsaturation, such as the acetylenyl radical.

The acyl group is a radical generally containing from 1 to 20 carbon atoms with a carbonyl group.

Among the aryl radicals, mention may be made especially of the phenyl radical, optionally substituted especially with a nitro or hydroxyl function.

Among the aralkyl radicals, mention may be made especially of the benzyl or phenethyl radical, optionally substituted especially with a nitro or hydroxyl function.

When $R_1$ or Z is a polymer chain, this polymer chain may be derived from a radical or ionic polymerization or derived from a polycondensation.

Preferably, the radical polymerization control agent is a compound which comprises a thiocarbonylthio group —S(C═S)—. Thus, for example, it may be a compound which comprises a xanthate group (bearing —S(C═S)—O— functions), for example a xanthate.

Preferably, the radical polymerization control agent is a compound chosen from xanthates, trithiocarbonates, dithiocarbamates and dithiocarbazates. Especially, xanthates bearing an O-ethyl xanthate function —S(C=S)—OCH$_2$CH$_3$, such as O-ethyl-S-(1-methoxycarbonylethyl) xanthate (CH$_3$CH(CO$_2$CH$_3$))S(C=S)—OEt. Another suitable radical polymerization control agent is dibenzyltrithiocarbonate of formula PhCH$_2$S(C=S)SCH$_2$Ph, in which Ph refers to phenyl.

According to any one of the invention embodiments, the ionic monomer suitable for the first step (i) may be anionic, cationic or amphoteric. A nonionic monomer may also be added on top of said ionic monomer in this step, and in such case, the resulting ionic charged polymeric dispersant comprises the ionic monomer and the nonionic monomer. It is also appreciated that the ionic monomer used may be a single monomer or a mixture of two or more monomers.

Preferably, the ionic monomer is an anionic monomer and the ionic charged polymeric dispersant is an anionic charged polymeric dispersant.

Anionic Monomer

Examples of the anionic monomer suitable for the present invention include and not limited to: ethylenically unsaturated carboxylic acids, sulfonic acids and phosphonic acids, and/or derivatives thereof such as acrylic acid (AA), methacrylic acid, ethacrylic acid, α-chloroacrylic acid, crotonic acid, maleic acid, maleic anhydride, itaconic acid, citraconic acid, mesaconic acid, glutaconic acid, aconitic acid, fumaric acid, vinylsulfonic acid, (meth)allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids, vinylphosphonic acid, α-methylvinyl phosphonic acid, allylphosphonic acid, and 2-acrylamido-2-methylpropanesulfonic acid (AMPS) or a salt thereof.

Advantageously, the anionic monomer in the first step (i) is according to general formula (II):

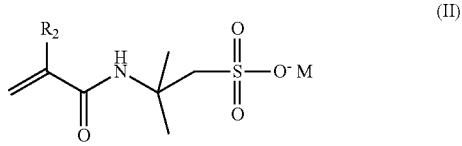

(II)

wherein:
R$_2$ is a hydrogen or a C$_1$ to C$_5$ alkyl or hydroxyalkyl, preferably, R$_2$ is hydrogen or methyl;
M is hydrogen, an alkali metal ion such as Na$^+$, K$^+$ and Ca$^{2+}$, or NH$_4^+$, or NR$_4^+$ wherein R is a C$_1$ to C$_5$ alkyl or hydroxyalkyl.

In a preferred embodiment, 2-acrylamido-2-methylpropanesulfonic acid or a salt thereof, or its combination with vinylsulfonic acid and a salt thereof, styrene sulfonic acid and a salt thereof, is used.

Cationic Monomer

Examples of the cationic monomers suitable for the invention include and not limited to: dialkylaminoalkyl acrylates and methacrylates and their quaternary or acid salts, including, but not limited to, dimethylaminoethyl acrylate methyl chloride quaternary salt, dimethylaminoethyl acrylate methyl sulfate quaternary salt, dimethylaminoethyl acrylate benzyl chloride quaternary salt, dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl methacrylamide methyl sulfate quaternary salt, methacrylamidopropyltrimethylammonium chloride, dimethylaminopropyl methacrylamide sulfuric acid salt, diethylaminoethylacrylate, diethylaminoethylmethacrylate and diallyldialkylammonium halides such as diallyldiethylammonium chloride and diallyldimethyl ammonium chloride. In a preferred embodiment, 2-acryloxyethyl trimethyl ammonium chloride, methacryloxyethyl trimethyl ammonium chloride, dimethyl diallyl ammonium chloride, acrylamidopropyl trimethyl ammonium chloride, methacrylamidopropyl trimethyl ammonium chloride was used solely or in combinations thereof.

Amphoteric Monomer

Examples of the amphoteric monomer suitable for the invention include and not limited to: betaine type, for instance, betaine group-containing (meth) acrylic ester, betaine group-containing (meth) acrylamide; sulfobetaine type, for instance sulfopropyl dimethylammonium propyl acrylamide, sulfopropyl dimethylammonium propyl methacrylamide (SPP), sulfohydroxypropyldimethylammoniumpropylmethacrylamido (SHPP), 2-vinyl(3-sulfopropyl)pyridinium betaine, 4-vinyl(3-sulfopropyl)pyridinium betaine, 1-vinyl-3-(3-sulfopropyl) imidazolium betaine, or sulfopropylmethyldiallylammoniumbetaine.

Nonionic Monomer

Examples of the nonionic monomer suitable for the invention include and not limited to: any water soluble monomer having neither anionic or cationic charge such as acrylamide, methacrylamide, N-methyl(meth)acrylamide, N-ethyl(meth)acrylamide, N-propyl(meth)acrylamide, N,N-dimethyl(meth) acrylamide, N,N-diethylacrylamide, N-vinylformamide, N-vinyl-N-methyl formamide, N-vinylacetamide, N-vinyl-N-methylacetamide, N-vinyl-N-ethylacetamide, N-vinylpropionamide, N-vinyl-N-methylpropionamide and N-vinylbutyramide, but not limited to other kinds of nonionic monomers, for example N-vinylformamide, N-vinyl-N-methylformamide, N-vinylacetamide, N-vinyl-N-methylacetamide, N-vinyl-N-ethylacetamide, N-vinylpyrrolidone, N-vinylpiperidone; N-vinylpropionamide, N-vinyl-N-methylpropionamide and N-vinylbutyramide.

Advantageously, the nonionic monomer in the first step (i) is according to the general formula (III):

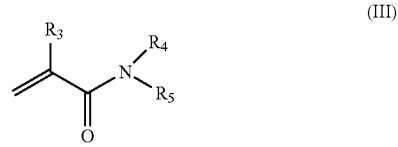

(III)

wherein:
R$_3$ is a hydrogen or a C$_1$ to C$_5$ alkyl or hydroxyalkyl, preferably, R$_3$ is hydrogen or methyl;

$R_4$ and $R_5$, independently, is a hydrogen or a $C_1$ to $C_5$ alkyl or hydroxyalkyl, preferably, $R_4$ and $R_5$, independently, is hydrogen or methyl.

Water Soluble Salt

A water soluble salt may be added in the first step (i). The water soluble salts suitable for the invention include and not limited to: ammonium sulfate, ammonium chloride, potassium chloride, calcium chloride, sodium bromide, calcium bromide, sodium sulfate, magnesium sulfate, aluminum sulfate, sodium nitrate, magnesium nitrate, potassium nitrate, and combinations thereof, and it is not limited to alkali metal and alkaline earth metal acetate, benzoate and formate.

In the second step (ii), the polymeric dispersant from the first step (i), either a living polymeric dispersant or not, is charged into an aqueous solution comprising at least a nonionic monomer and an ionic monomer, followed by continuous polymerization to obtain said copolymer.

Examples of the nonionic monomer suitable for the second step (ii) of the process include and not limited to: any water soluble monomer having neither anionic or cationic charge such as acrylamide, methacrylamide, N-methyl (meth)acrylamide, N-ethyl(meth)acrylamide, N-propyl (meth)acrylamide, N,N-dimethyl(meth) acrylamide, N,N-diethylacrylamide, N-vinylformamide, N-vinyl-N-methyl formamide, N-vinylacetamide, N-vinyl-N-methylacetamide, N-vinyl-N-ethylacetamide, N-vinylpropionamide, N-vinyl-N-methylpropionamide and N-vinylbutyramide, but not limited to other kinds of nonionic monomers, for example N-vinylformamide, N-vinyl-N-methylformamide, N-vinylacetamide, N-vinyl-N-methylacetamide, N-vinyl-N-ethylacetamide, N-vinylpyrrolidone, N-vinylpiperidone; N-vinylpropionamide, N-vinyl-N-methylpropionamide and N-vinylbutyramide.

According to every one of the invention embodiments, the nonionic monomer used in the second step (ii) is preferably according to the general formula (III):

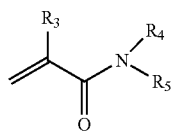

(III)

wherein:
$R_3$ is a hydrogen or a $C_1$ to $C_5$ alkyl or hydroxyalkyl, preferably, $R_3$ is hydrogen or methyl;
$R_4$ and $R_5$, independently, is a hydrogen or a $C_1$ to $C_5$ alkyl or hydroxyalkyl, preferably, $R_4$ and $R_5$, independently, is hydrogen or methyl.

The ionic monomer suitable for the second step (ii) may be selected from those cationic, anionic and amphoteric monomers described above, preferably the ionic monomer in the second step (ii) is an anionic monomer.

Advantageously, the anionic monomer in the second step (ii) is according to general formula (II):

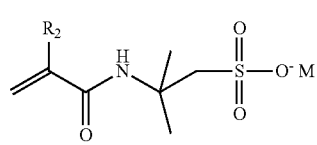

(II)

wherein:
$R_2$ is a hydrogen or a $C_1$ to $C_5$ alkyl or hydroxyalkyl, preferably, $R_2$ is hydrogen or methyl;
M is hydrogen, an alkali metal ion such as $Na^+$, $K^+$ and $Ca^{2+}$, or $NH_4^+$, or $NR_4^+$ wherein R is a $C_1$ to $C_5$ alkyl or hydroxyalkyl.

In a preferred embodiment, 2-acrylamido-2-methylpropanesulfonic acid or a salt thereof, or its combination with vinylsulfonic acid and a salt thereof, styrene sulfonic acid and a salt thereof, is used in the second step (ii).

According to the invention, a water soluble salt is added in the second step (ii). The water soluble salts suitable for the invention include and not limited to: ammonium sulfate, ammonium chloride, potassium chloride, calcium chloride, sodium bromide, calcium bromide, sodium sulfate, magnesium sulfate, aluminum sulfate, sodium nitrate, magnesium nitrate, potassium nitrate, and combinations thereof, and it is not limited to alkali metal and alkaline earth metal acetate, benzoate and formate. The salt is notably a sulfate salt, such as ammonium sulfate, sodium sulfate, magnesium sulfate, aluminum sulfate and a mixture thereof.

In one embodiment, an ionic charged polymeric dispersant prepared under free radical forming conditions as described above is used in the second step (ii). The resulting ionic charged polymeric dispersant function as a stabilizer for the subsequent polymerization reaction.

In another embodiment, an ionic charged polymeric dispersant prepared in presence of a radical polymerization control agent as described above is used in the second step (ii). The resulting ionic charged polymeric dispersant is a living polymer which is copolymerized with additional nonionic monomer and ionic monomer added in the second step (ii). The copolymer obtained in the second step is a single polymer since the living ionic charged polymeric dispersant reacts and forms covalent bond with subsequently loaded monomers, and becomes part of the copolymer chain. In such case, the second step (ii) may be conducted using the conditions for MADIX process as known to a skilled person, notably those according to U.S. Pat. No. 9,580,535. It is appreciated that where the copolymer is prepared under the controlled radical polymerization conditions, the copolymer comprises a block of an ionic charged polymeric dispersant at one terminal; which is formed in said first step (i), and a block comprising said nonionic monomer and said ionic monomer which are loaded in the second step (ii). The copolymer preferably comprises from 10% to 80% of said block of the ionic charged polymeric dispersant, and from 20% to 90% of said block of additional monomers added in the second step (ii); more preferably from 15% to 25% of said block of the ionic charged polymeric dispersant and from 70% to 85% of said block of additional monomers added in the second step (ii).

A polyol may be added in the reaction mixture in the second step (ii). Polyols suitable for the invention include and not limited to: dialcohols, polyhydric alcohols, monosaccharides and disaccharides. Preferred polyols include propylene glycol, isoprene glycol, 1,3-butanediol, dipropylene glycol, glycerol, diglycerol, triglycerol, polyglycerol, trimethylolpropane, erythritol, pentaerythritol, sorbitan, sorbitol, glucose, maltitol, saccharose, trehalose, polyethylene glycol.

Preferred polyols may be selected from ethylene glycol, glycerol, propylene glycol, and pentaerythritol.

An initiator for radical generation may also be used in the process, either in the first step (i) or the second step (ii), or both. Numerous free radical forming compounds may be used as the water-soluble initiator utilized as catalysts for the polymerization reactions. Typical compounds used as catalysts may be those that form free radicals via thermal decomposition, referred to in the art as "thermal initiators" or combinations of compounds that fond free radicals via oxidation/reduction reactions. Such catalysts are combinations of an oxidizing agent and a reducing agent and are commonly referred to in the art as "redox initiators". Either thermal or redox catalysts may be used for the present invention.

Typical catalysts utilized as the thermal initiators include, for example, persulfates, specifically potassium persulfate, sodium persulfate, ammonium persulfate, 2,2'-Azobis(2-methylpropionamide)dihydrochloride and the like. Typical redox initiators include, for example, combinations of oxidizing agents or initiators such as peroxides, specifically benzoyl peroxide, t-butyl hydroperoxide, lauryl peroxide, hydrogen peroxide, 2,2'-diazobisisobutyronitrile, and the like. Typical reducing agents include sodium bisulfite, sodium formaldehyde sulfoxylate, sodium hydrosulfite, and ascorbic and isoascorbic acid. The water-soluble initiator may be employed in an amount of from 0.1 to 3 weight percent of the total monomer weight, and more preferably from about 0.1 to 1 weight percent of the total monomer charge.

Other additives or components which are known to those skilled in the art may also use in accordance with the present invention. These include chain transfer agents, which are used to control molecular weight, additives to adjust pH, and compounds utilized as protective colloids which provide additional stability to the polymer particles.

In a preferred embodiment of the present invention, there is provided a method for controlling aqueous fluids, such as water, by treating a subterranean formation in a producing well, comprising the steps of:
(1) providing an emulsion comprising: (a) a copolymer in an amount of from 10 wt % to 30 wt %; (b) a water soluble salt in an amount of from 10 wt % to 50 wt %; and (c) optionally a polyol; weight percentages are based on the total weight of the emulsion;
(2) diluting said emulsion in water to form a treatment fluid;
(3) introducing said treatment fluid into the producing well.
wherein said emulsion is prepared by a process comprising the steps of:
(i) an ionic charged polymeric dispersant is prepared from at least an ionic monomer in presence of a radical polymerization control agent;
(ii) said polymer dispersant is charged into an aqueous solution comprising a nonionic monomer and an ionic monomer, the mixture is then subject to continuous polymerization, in presence of a water soluble salt, to obtain said copolymer.

In another preferred embodiment of the present invention, there is provided a method for controlling aqueous fluids, such as water, by treating a subterranean formation in a producing well, comprising the steps of:
(1) providing an emulsion comprising: (a) a copolymer in an amount of from 10 wt % to 30 wt %; (b) a water soluble salt in an amount of from 10 wt % to 50 wt %; and (c) optionally a polyol; weight percentages are based on the total weight of the emulsion;
(2) diluting said emulsion in water to form a treatment fluid;
(3) introducing said treatment fluid into the producing well.
wherein said emulsion is prepared by a process comprising the steps of:
(i) an ionic charged polymeric dispersant is prepared from at least an ionic monomer in presence of a radical polymerization control agent;
(ii) said polymer dispersant is charged into an aqueous solution comprising a nonionic monomer and an ionic monomer, the mixture is then subject to continuous polymerization, in presence of a water soluble salt, to obtain said copolymer; wherein said nonionic monomer is according to the general formula (III):

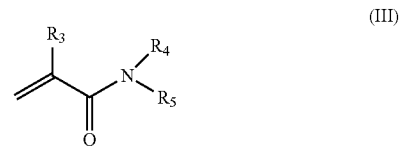

wherein:
$R_3$ is a hydrogen or a $C_1$ to $C_5$ alkyl or hydroxyalkyl, preferably, $R_3$ is hydrogen or methyl;
$R_4$ and $R_5$, independently, is a hydrogen or a $C_1$ to $C_5$ alkyl or hydroxyalkyl, preferably, $R_4$ and $R_5$, independently, is hydrogen or methyl.

In still another preferred embodiment of the present invention, there is provided a method for controlling aqueous fluids, such as water, by treating a subterranean formation in a producing well, comprising the steps of:
(1) providing an emulsion comprising: (a) a copolymer in an amount of from 10 wt % to 30 wt %; (b) a water soluble salt in an amount of from 10 wt % to 50 wt %; and (c) optionally a polyol; weight percentages are based on the total weight of the emulsion;
(2) diluting said emulsion in water to form a treatment fluid;
(3) introducing said treatment fluid into the producing well.
wherein said emulsion is prepared by a process comprising the steps of:
(i) an ionic charged polymeric dispersant is prepared from at least an ionic monomer in presence of a radical polymerization control agent;
(ii) said polymer dispersant is charged into an aqueous solution comprising a nonionic monomer and an ionic monomer, the mixture is then subject to continuous polymerization, in presence of a water soluble salt, to obtain said copolymer; wherein said nonionic monomer is according to the general formula (III):

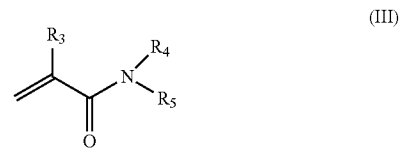

wherein:
$R_3$ is a hydrogen or a $C_1$ to $C_5$ alkyl or hydroxyalkyl, preferably, $R_3$ is hydrogen or methyl;
$R_4$ and $R_5$, independently, is a hydrogen or a $C_1$ to $C_5$ alkyl or hydroxyalkyl, preferably, $R_4$ and $R_5$, independently, is hydrogen or methyl; and said ionic monomer in said second step (ii) is according to general formula (II):

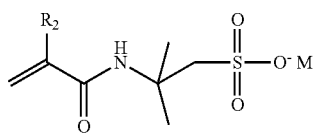

wherein:

$R_2$ is a hydrogen or a $C_1$ to $C_5$ alkyl or hydroxyalkyl, preferably, $R_2$ is hydrogen or methyl;

M is hydrogen, an alkali metal ion such as $Na^+$, $K^+$ and $Ca^{2+}$, or $NH_4^+$, or $NR_4^+$ wherein R is a $C_1$ to $C_5$ alkyl or hydroxyalkyl.

The emulsion according to the invention is prepared in an aqueous salt media, for example, the second step (ii) is conducted in the presence of a water soluble salt. The emulsion contains high level of polymer active, combined with satisfactory viscosity. For example, said emulsion contains said copolymer in an amount of from 10 wt % to 30 wt %; preferably from 10 wt % to 25 wt %; more preferably from 15 wt % to 25 wt %; weight percentages are based on total weight of the emulsion. In contrast, polymer dispersions prepared by conventional methods, such as those prepared in water, normally contain less than 5 wt % of polymer actives. Increasing the polymer content in these polymer dispersions will, on the other hand, lead to very high viscosities. This will cause problems to the oil and gas recovery operation.

Advantageously, the emulsion comprises:
a) 15 wt % to 30 wt % of the copolymer;
b) 15 wt % to 50 wt % of the water soluble salt;
c) 0 to 5 wt % of the polyol; and
d) water;

weight percentages are based on total weight of the emulsion.

More advantageously, the emulsion comprises:
a) 15 wt % to 25 wt % of the copolymer;
b) 20 wt % to 50 wt % of the water soluble salt;
c) 0 to 5 wt % of the polyol; and
d) water;

weight percentages are based on total weight of the emulsion.

The copolymer according to the invention preferably has an weight average molecular weight of 750,000 to 10,000,000 Daltons, more preferably 1,000,000 to 5,000,000 Daltons, even more preferably from 2,500,000 to 5,000,000 Daltons.

In a preferred embodiment of the invention, said copolymer comprises (i) a block of an ionic charged polymeric dispersant at one terminal; and (ii) a block containing a nonionic monomer and an ionic monomer;

wherein said ionic charged polymeric dispersant is an anionic charged polymeric dispersant prepared from at least an anionic monomer according to general formula (II):

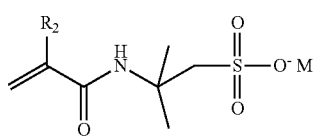

wherein:

$R_2$ is a hydrogen or a $C_1$ to $C_5$ alkyl or hydroxyalkyl, preferably, $R_2$ is hydrogen or methyl;

M is hydrogen, an alkali metal ion such as $Na^+$, $K^+$ and $Ca^{2+}$, or $NH_4^+$, or $NR_4^+$ wherein R is a $C_1$ to $C_5$ alkyl or hydroxyalkyl;

and said nonionic monomer is according to general formula (III):

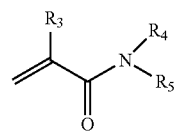

wherein:

$R_3$ is a hydrogen or a $C_1$ to $C_5$ alkyl or hydroxyalkyl, preferably, $R_3$ is hydrogen or methyl;

$R_4$ and $R_5$, independently, is a hydrogen or a $C_1$ to $C_5$ alkyl or hydroxyalkyl, preferably, $R_4$ and $R_5$, independently, is hydrogen or methyl.

Method for Selective Modification of Permeability

The emulsion described herein may be diluted in an aqueous-based treatment fluid to achieve selective permeability modification of a subterranean formation. Notably, the emulsion may be used for selectively reducing production of aqueous fluids, such as water, from a subterranean formation in a producing well without substantially effecting the production of associated hydrocarbons, such as oil, gas and a mixture thereof.

The method may further include pre-hydrolyzing the copolymer prior to introducing the treatment fluid into the formation. The pre-hydrolyzing may include diluting the copolymer in an aqueous solution; adjusting a pH of the treatment fluid to from about 1 to about 3; heating the treatment fluid to a temperature of from about 20° C. to about 100° C.; and neutralizing the treatment fluid to a pH of from about 7 to about 8.5. The method may also further include adjusting the pH of the treatment fluid to below about 8.0, just prior to the introducing and after the hydrolyzing.

The treatment fluid may further include a mutual solvent. In this regard, any mutual solvent suitable for solubilizing hydrocarbons may be employed including, but not limited to, terpenes (such as limonene), $C_3$ to $C_9$ alcohols, glycolether (such as ethylene glycol monobutyl ether, "EGMBE"), or mixtures thereof.

Other additives known in the art for use in stimulation and well treatments may be employed in the method of the invention. For example, surfactants, thickeners, diversion agents, pH buffers, etc. may be used. In one embodiment, internal diverting materials may be employed if desired. Examples of suitable diverting agents include, but are not limited to, viscous water external emulsions, and are known to those of skill in the art.

The emulsion may be added in the treatment fluid in a concentration of from about 500 ppm to about 10,000 ppm, for instance, from about 500 ppm to 5000 ppm, for instance from about 1000 ppm to 5000 ppm.

The treatment fluid may be introduced into the subterranean formation prior to introducing a stimulation fluid into the subterranean formation. The treatment fluid may be used to contact the subterranean formation and substantially reduce permeability to water within the formation without substantially reducing permeability to oil within the formation.

The treatment fluid may be batch prepared or prepared by continuous mix processes. For example, the treatment fluid may be first prepared in total, and then injected or otherwise introduced into a subterranean formation. This is referred to as a "batch mixing" process. In another embodiment, the treatment fluid may be prepared by continuous mix processes, wherein the treatment fluid components are mixed together while the fluid is simultaneously introduced into the wellbore. By "introduced" it is meant that a fluid may be pumped, injected, poured, released, displaced, spotted, circulated or otherwise placed within a well, wellbore, and/or formation using any suitable manner known in the art.

The emulsion described herein and the treatment fluid thereof may be suitable for well treatments known in the art including, but not limited to, fresh water, acidified water having pH range from 1.0 to 3.0, brine, sea water, synthetic brine (such as 2% KCl), etc.

The emulsion described herein may be added to or combined with an aqueous based fluid at any point prior to introduction into a wellbore, and may be used in all or part of the treatment fluid volume. The emulsion may be used as the only component in an aqueous treatment fluid or may be combined with other components of stimulation fluid or other well treatment fluid (such as hydraulic fracturing fluids, acid fluids, surfactant squeeze treatment fluids). It may be desirable to perform the water control treatment as soon as a coning or channeling problem (or potential coning or channeling problem) is identified, rather than waiting to the point where coning or channeling becomes severe.

When used in conjunction with well treatments such as stimulation treatments, the treatment fluid introduction flow rates typically depend on the nature of the treatment being performed. For example, in the case of an acid matrix treatment, the treatment fluid described herein may be included in a "spearhead" fluid ahead of the acid treatment, in the acid treatment (or both), and are typically introduced at a rate below the flow rate necessary to fracture the formation in a manner similar to the rate employed for the treatment fluid injected alone. When used in conjunction with a hydraulic fracture treatment, fluid introduction rates (whether utilized as a spearhead, in the fracture treatment fluid, or both) are typically above rates that cause pressures to exceed those necessary to fracture a formation. Whether employed as a stand-alone fluid or in a stimulation fluid (such as an acid fluid or hydraulic fracture fluid), similar concentrations of copolymer are typically employed.

In one water control treatment embodiment for treating a subterranean formation in a producing well, the well may be shut-in from about 6 to about 48 hours after introduction of the treatment fluid in order to allow maximum anchoring and retention of the copolymer. Following such a shut-in period, the well may be placed back on production.

Example 1—Preparation of Living Ionic Polymeric Dispersant (First Step (i))

Polymeric dispersant was prepared in accordance with the following procedure: 250.03 g of 2-acrylamide-2-methyl propane sulfonate sodium salt (50 wt %), 0.05 g of Rhodixan® A1 (radical polymerization control agent, from Solvay), and 250.11 g of deionized water were charged into a 1-litre reactor equipped with mechanical stirrer, the mixture was agitated under 200 rpm for 30 mins to form a homogenous solution. The solution was sparged with 800 cc/min of nitrogen gas for 40 mins and then was heated to 35° C. followed by addition of 0.5 g of 5 wt % aqueous solution of sodium persulfate (SPS) and 1.3 g of 5 wt % aqueous solution of sodium formaldehyde sulfoxylate (NaFS). After every one hour, same amount of SPS and NaFS were added. After 3 hours, the formed viscous solution was heated to 45-50° C., and 0.5 g of 10 wt % solution of 2,2'-Azobis(2-methylpropionamide)dihydrochloride was added. After aging for 1 hour, the mixture was cooled down to room temperature and the polymeric dispersant solution was recovered.

Example 2—Preparation of Polymer Emulsion (Second Step (ii))

71.66 g of ammonium sulphate, 12.58 g of sodium sulphate, 0.05 g of EDTA and 213.2 g of deionized were charged into a 1-litre resin reactor and stirred for 15 mins. Subsequently, 95.12 g of acrylamide (50 wt %), 8.6 g of glycerol, 53.09 g of 2-acrylamide-2-methyl propane sulfonate sodium (50 wt %) and 44.6 g of the polymeric dispersant prepared in Example 1 were added and agitated to form a homogenous solution. The solution was sparged with 800 cc/min of nitrogen gas for 40 mins and then was heated to 40° C. followed by addition of 0.75 g of 10 wt % aqueous solution of 2,2'-Azobis(2-methylpropionamide)dihydrochloride. After every 30 mins, same amount of 2,2'-Azobis (2-methylpropionamide) dihydrochloride was added. During the polymerization process, the entire mixture became milky. After 3 hours, 3 g of 10 wt % solution of 2,2'-Azobis (2-methyl propionamide)dihydrochloride was added and aged for 1 hour.

Example 3—Preparation of Polymer Emulsion (Second Step (ii))

71.65 g of ammonium sulphate, 12.61 g of sodium sulphate, 0.05 g of EDTA and 213.0 g of deionized were charged into a 1-litre resin reactor and stirred for 15 mins. Subsequently, 118.45 g of acrylamide (50 wt %), 4.3 g of glycerol, 29.59 g of 2-acrylamide-2-methyl propane sulfonate sodium (50 wt %) and 44.63 g of the polymeric dispersant prepared in Example 1 were added and agitated to form a homogenous solution. The solution was sparged with 800 cc/min of nitrogen gas for 40 mins and then was heated to 40° C. followed by addition of 0.75 g of 10 wt % aqueous solution of 2,2'-Azobis(2-methylpropionamide)dihydrochloride. After every 30 mins, same amount of 2,2'-Azobis (2-methylpropionamide) dihydrochloride was added. During the polymerization process, the entire mixture became milky. After 3 hours, 3 g of 10 wt % solution of 2,2'-Azobis (2-methylpropionamide)dihydrochloride was added and aged for 1 hour. The final polymer emulsion was obtained.

Example 4—Preparation of Polymer Emulsion (Second Step (ii))

286.72 g of ammonium sulphate, 50.45 g of sodium sulphate, 0.2 g of EDTA and 816.1 g of deionized were charged into a 2.5-litre resin reactor and stirred for 15 mins. Subsequently, 380.4 g of acrylamide (50 wt %), 31.98 g of glycerol, 212.41 g of 2-acrylamide-2-methyl propane sulfonate sodium (50 wt %) and 213.42 g of the polymeric dispersant prepared in Example 1 were added and agitated to form a homogenous solution. The solution was sparged with 800 cc/min of nitrogen gas for 40 mins and then was heated to 45-50° C. followed by addition of 3 g of 10 wt % aqueous solution of 2,2'-Azobis(2-methylpropionamide)dihydrochloride. After every 30 mins, same amount of 2,2'-Azobis (2-methylpropionamide) dihydrochloride was added. During the polymerization process, the entire mixture became milky. After 3 hours, 12 g of 10 wt % solution of 2,2'-Azobis (2-methyl propionamide) dihydrochloride was added and aged for 1 hour. The final polymer emulsion was obtained.

The formulations obtained in Examples 2 to 4 are shown in Table 1 below:

TABLE 1

|  | Example 2 | Example 3 | Example 4 |
|---|---|---|---|
| AM-AMPS copolymer | 16.1 wt % | 16.23 wt % | 16.40 wt % |
| Glycerol | 1.70 wt % | 0.86 wt % | 1.60 wt % |
| Ammonium sulfate | 14.29 wt % | 14.41 wt % | 14.31 wt % |
| Sodium sulfate | 2.51 wt % | 2.54 wt % | 2.52 wt % |
| Initiator | 0.60 wt % | 0.60 wt % | 0.60 wt % |
| Water | balance | balance | balance |
| Total | 100 wt % | 100 wt % | 100 wt % |
| Viscosity LVT, @ 25° C., SP 1#, @ 30 RPM | 1156 cP | 1265 cP | 1289 cP |

Example 5—Filtration Tests

The selective modification of permeability conferred by the inventive emulsions were assessed by filtration tests according to the procedures below. The emulsion prepared in Example 2 was used.

1. Place a filtration disc (Berea sandstone disc from Ofite Company, having various permeability range 10 md-1 Darcy) on the bottom of an HTHP fluid loss cell (from Ofite Company).
2. Pour 250 ml 2% KCl solution into the fluid loss cell, close the top cap of the cell and then apply about 5.0 psi pressure in the cell. Heat the cell for about 30 minutes until the temperature reaches 150° F. Once the temperature in the cell is stabilized at the testing temperature, open the bottom valve to flow the 2% KCl solution through the Berea sandstone disc, and collect the fluid leak off volume vs time. This flow rate is Qwi value (water initial flow rate). 2% KCl solution should be completely drain out.
3. Open the top cap then pour 250 ml Calumet LVP 100 Oil (viscosity is about 1.2 cP) into the fluid loss cell then apply about 5.0 psi pressure, wait until the temperature reaches 150° F. (about 30 minutes). Open the bottom valve to allow oil to flow through the Berea sandstone disc and collect the fluid volume vs time. This flow rate is Qoi value (oil initial flow rate). Calumet LVP 100 Oil should be drained out completely.
4. Open the bottom cap of fluid loss cell, reverse the disc then close the bottom cap.
5. Repeat step 3 with 2% KCl solution contains from 2 wt % to 6 wt % copolymer into the fluid loss cell, after 30 minutes shut in open bottom valve and collect about 20 ml leak off fluid. Close the bottom valve then shut in for 120 minutes.
6. After 120 minutes shut in, release pressure, remove the fluid loss cell. Open the top cap to pour out the fluid. Open the bottom cap then reverse the disc, close the bottom cap.
7. Place the fluid loss cell back its holder.
8. Repeat step 2, this will be Qwf (water final flow rate).
9. Repeat step 3, this will be Qof (oil final flow rate).

Results of the filtration tests are shown in Table 2 below. The reduction percentage in water flow is calculated as (water final flow rate−water initial flow rate)/water initial flow rate. The reduction percentage in oil flow is calculated as (oil final flow rate−oil initial flow rate)/oil initial flow rate.

TABLE 2

| Concentration of copolymer | Permeability | Temperature | % (Water reduction) | % (Oil reduction) |
|---|---|---|---|---|
| 2.0 wt % | 300 md | 150° F. | 74.6 | 27.0 |
| 2.5 wt % | 300 md | 150° F. | 85.3 | 14.3 |
| 3.0 wt % | 300 md | 150° F. | 73.9 | 35.7 |
| 6.0 wt % | 300 md | 150° F. | 89.1 | 47.5 |

It is demonstrated that the emulsion according to the invention could selectively reduce the permissibility of water. The selectivity is high, indicated by the differentiated reduction in water flow and oil flow.

The invention claimed is:

1. A method for controlling aqueous fluids by treating a subterranean formation in a producing well, comprising the steps of:
    (1) providing an emulsion comprising: (a) a copolymer in an amount of from 10 wt % to 30 wt %; (b) a water soluble salt in an amount of from 10 wt % to 50 wt %; and (c) optionally a polyol; weight percentages are based on the total weight of the emulsion;
    (2) diluting said emulsion in water to form a treatment fluid;
    (3) introducing said treatment fluid into the producing well,
    wherein said emulsion is prepared by a process comprising the steps of:
    (i) preparing an ionic charged polymeric dispersant from at least an ionic monomer, optionally in the presence of a radical polymerization control agent; and
    (ii) charging said polymer dispersant into an aqueous solution comprising a nonionic monomer and an ionic monomer, the mixture is then subject to continuous polymerization, in presence of a water soluble salt, to obtain said copolymer.

2. The method according to claim 1, wherein said emulsion comprises: (a) 15 wt % to 30 wt % of the copolymer; (b) 15 wt % to 50 wt % of the water soluble salt; (c) 0 to 5 wt % of the polyol; and (d) water; weight percentages are based on total weight of the emulsion.

3. The method according to claim 1, wherein said emulsion comprises: (a) 15 wt % to 25 wt % of the copolymer; (b) 20 wt % to 50 wt % of the water soluble salt; (c) 0 to 5 wt % of the polyol; and (d) water; weight percentages are based on total weight of the emulsion.

4. The method according to claim 1, wherein said water soluble salt is selected from the group consisting of: ammonium sulfate, ammonium chloride, potassium chloride, calcium chloride, sodium bromide, calcium bromide, sodium sulfate, magnesium sulfate, aluminum sulfate, sodium nitrate, magnesium nitrate, potassium nitrate, and combinations thereof.

5. The method according to claim 1, wherein said ionic charged polymeric dispersant is prepared from at least an ionic monomer according to general formula (II):

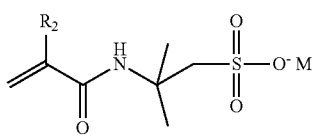

wherein:

$R_2$ is a hydrogen or a $C_1$ to $C_5$ alkyl or hydroxyalkyl;

M is hydrogen, an alkali metal ion, or $NR_4^+$ wherein R is a $C_1$ to $C_5$ alkyl or hydroxyalkyl.

6. The method according to claim 1, wherein said nonionic monomer in the second step (ii) is according to the general formula (III):

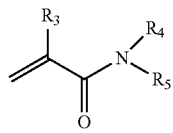

(III)

wherein:

$R_3$ is a hydrogen or a $C_1$ to $C_5$ alkyl or hydroxyalkyl;

$R_4$ and $R_5$, independently, is a hydrogen or a $C_1$ to $C_5$ alkyl or hydroxyalkyl; and said ionic monomer in the second step (ii) is according to the general formula (II):

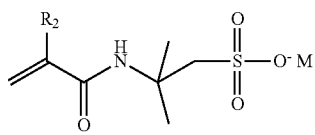

(II)

wherein:

$R_2$ is a hydrogen or a $C_1$ to $C_5$ alkyl or hydroxyalkyl;

M is hydrogen, an alkali metal ion or $NR_4^+$ wherein R is a $C_1$ to $C_5$ alkyl or hydroxyalkyl.

7. The method according to claim 1, wherein in first step (i) said ionic charged polymeric dispersant is prepared from said ionic monomer in the presence of a radical polymerization control agent.

8. The method according to claim 7, wherein said radical polymerization control agent is according to general formula (I):

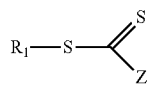

(I)

wherein Z represents:
 a hydrogen atom,
 a chlorine atom,
 an optionally substituted alkyl or optionally substituted aryl radical,
 an optionally substituted heterocycle,
 an optionally substituted alkylthio radical,
 an optionally substituted arylthio radical,
 an optionally substituted alkoxy radical,
 an optionally substituted aryloxy radical,
 an optionally substituted amino radical,
 an optionally substituted hydrazine radical,
 an optionally substituted alkoxycarbonyl radical,
 an optionally substituted aryloxycarbonyl radical,
 an optionally substituted carboxyl or acyloxyl radical,
 an optionally substituted aryloxy radical,
 an optionally substituted carbamoyl radical,
 a cyano radical,
 a dialkyl- or diaryl-phosphonato radical,
 a dialkyl-phosphinato or diaryl-phosphinato radical, or
 a polymer chain,
and $R_1$ represents:
 an optionally substituted alkyl, acyl, aryl, aralkyl, alkene or alkyne group,
 a saturated or unsaturated, aromatic, optionally substituted carbocycle or heterocycle, or
 a polymer chain.

9. The method according to claim 8, wherein said radical polymerization control agent is a compound chosen from the group consisting of: xanthates, trithiocarbonates, dithiocarbamates and dithiocarbazates.

10. The method according to claim 7, wherein said ionic charged polymeric dispersant is prepared from at least an ionic monomer according to general formula (II):

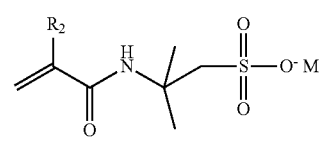

(II)

wherein:

$R_2$ is a hydrogen or a $C_1$ to $C_5$ alkyl or hydroxyalkyl;

M is hydrogen, an alkali metal ion, or $NR_4^+$ wherein R is a $C_1$ to $C_5$ alkyl or hydroxyalkyl.

11. The method according to claim 7, wherein said nonionic monomer in the second step (ii) is according to the general formula (III):

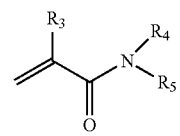

(III)

wherein:

$R_3$ is a hydrogen or a $C_1$ to $C_5$ alkyl or hydroxyalkyl;

$R_4$ and $R_5$, independently, is a hydrogen or a $C_1$ to $C_5$ alkyl or hydroxyalkyl; and said ionic monomer in the second step (ii) is according to the general formula (II):

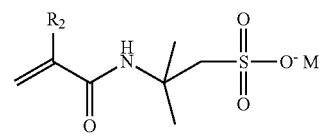

(II)

wherein:

$R_2$ is a hydrogen or a $C_1$ to $C_5$ alkyl or hydroxyalkyl;

M is hydrogen, an alkali metal ion or $NR_4^+$ wherein R is a $C_1$ to $C_5$ alkyl or hydroxyalkyl.

12. The method according to claim 1, wherein said copolymer has an average weight molecular weight of from 750,000 to 10,000,000 Daltons.

13. The method according to claim 1, wherein said emulsion is added in said treatment fluid in a concentration of from 500 ppm to 10,000 ppm.

* * * * *